(12) United States Patent
Junge (10) Patent No.: US 11,022,007 B1
(45) Date of Patent: Jun. 1, 2021

(54) ASSEMBLED CAMSHAFT AND METHOD FOR PRODUCING AN ASSEMBLED CAMSHAFT

(71) Applicants: THYSSENKRUPP PRESTA TECCENTER AG, Eschen (LI); thyssenkrupp AG, Essen (DE)

(72) Inventor: Volker Junge, Wernigerode (DE)

(73) Assignees: THYSSENKRUPP PRESTA TECCENTER AG, Eschen (LI); THYSSENKRUPP AG, Essen (DE)

( * ) Notice: Subject to any disclaimer, the term of this patent is extended or adjusted under 35 U.S.C. 154(b) by 0 days.

(21) Appl. No.: 16/769,335

(22) PCT Filed: Dec. 12, 2018

(86) PCT No.: PCT/EP2018/084464
§ 371 (c)(1),
(2) Date: Jun. 3, 2020

(87) PCT Pub. No.: WO2019/115579
PCT Pub. Date: Jun. 20, 2019

(30) Foreign Application Priority Data

Dec. 13, 2017 (DE) ...................... 10 2017 222 605.6

(51) Int. Cl.
*F01L 1/18* (2006.01)
*F01L 1/047* (2006.01)
(Continued)

(52) U.S. Cl.
CPC ............ *F01L 1/047* (2013.01); *F16H 53/025* (2013.01); *F01L 2001/0473* (2013.01); *F01L 2013/0052* (2013.01)

(58) Field of Classification Search
CPC ............... F01L 1/047; F01L 2013/0052; F01L 2001/0473; F16H 53/025
See application file for complete search history.

(56) References Cited

U.S. PATENT DOCUMENTS

| 2006/0064872 | A1 | 3/2006 | Shirai |
| 2010/0162976 | A1 | 7/2010 | Schuler |
| 2011/0185995 | A1* | 8/2011 | Deblaize ............. F01L 1/34413 |
| | | | 123/90.18 |

FOREIGN PATENT DOCUMENTS

| DE | 197 10 847 A | 9/1998 |
| DE | 10 2009 024 455 A | 1/2011 |

(Continued)

OTHER PUBLICATIONS

English Translation of International Search Report issued in PCT/EP2018/084464, dated Feb. 27, 2019.

*Primary Examiner* — Zelalem Eshete
(74) *Attorney, Agent, or Firm* — thyssenkrupp North America, LLC (57) ABSTRACT

A camshaft for an engine and a method of assembling such a camshaft, wherein the camshaft has a base shaft and an external toothing which extends at least in certain portions axially along the base shaft A hub has an internal toothing which correlates with the external toothing of the base shaft such that the hub is connected rotationally conjointly and axially non-displaceably to the base shaft. The external toothing has at least one form-fit subregion, which extends axially at least in certain portions along the base shaft, or one force-fit subregion in order for the hub to be arranged at least in a form-fitting or force-fitting manner, and wherein at least the form-fit subregion or the force-fit subregion is adjoined by at least one alignment region which extends at least in certain portions axially along the base shaft and which serves for the angular alignment of the hub.

13 Claims, 5 Drawing Sheets

(51) Int. Cl.
*F16H 53/02* (2006.01)
*F01L 13/00* (2006.01)

(56) References Cited

FOREIGN PATENT DOCUMENTS

| | | |
|---|---|---|
| DE | 10 2009 057 633 B | 3/2011 |
| DE | 10 2011 103 544 A | 12/2012 |
| DE | 10 2012 109 689 A | 4/2014 |
| EP | 0119112 A | 9/1984 |
| JP | 2014077474 A | 5/2014 |

\* cited by examiner

US 11,022,007 B1

ASSEMBLED CAMSHAFT AND METHOD FOR PRODUCING AN ASSEMBLED CAMSHAFT

CROSS REFERENCE TO RELATED APPLICATIONS

This application is a U.S. National Stage Entry of International Patent Application Serial Number PCT/EP2018/084464, filed Dec. 12, 2018, which claims priority to German Patent Application No. DE 10 2017 222 605.6, filed Dec. 13, 2017, the entire contents of both of which are incorporated herein by reference.

FIELD

The present disclosure generally relates to an assembled camshaft and to a method for producing an assembled camshaft.

BACKGROUND

An assembled camshaft for installation into an internal combustion engine is known from DE 10 2011 103 544 A1. In the case of the camshaft described therein, the base shaft has an external toothing by means of which sliding cam units are guided axially on the base shaft and are connected rotationally conjointly to the base shaft. Bearing rings fastened to the external toothing serve for the mounting and guidance of the camshaft in the internal combustion engine. The bearing elements are in particular thermally joined by means of an interference fit. It is however to be considered disadvantageous here that the bearing rings are pushed in an overlapping manner over the external toothing, and that large temperature differences act on the camshaft or on the components during the thermal joining.

Thus a need exists to eliminate the disadvantages in the case of an assembled camshaft, in particular in the case of a method for producing an assembled camshaft. It is sought to provide a method for producing a camshaft and to provide a camshaft produced in accordance with said method, in the case of which no introduction of heat into the axially fixed or the axially non-displaceable hub is performed. It is furthermore sought to provide a method for producing a camshaft, in the case of which the axially non-displaceable hub is pushed over a toothing of the base shaft only over short sections.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present invention relates to an assembled camshaft and to a method for producing an assembled camshaft, wherein the camshaft is formed as a sliding camshaft and has, on the base shaft, axially fixed functional elements, such as for example cams, and axially displaceable cams.

According to the invention, the assembled camshaft for an internal combustion engine comprises a base shaft with an external toothing which extends at least in certain portions axially along the base shaft, and comprising at least one hub with an internal toothing which correlates with the external toothing of the base shaft such that the hub is connected rotationally conjointly and axially non-displaceably to the base shaft, wherein the external toothing has at least one form-fit subregion, which extends axially at least in certain portions along the base shaft, and the force-fit subregion in order for the hub to be arranged at least in a form-fitting or force-fitting manner. Furthermore, at least the form-fit subregion or the force-fit subregion is adjoined by at least one alignment region which extends at least in certain portions axially along the base shaft. Here, the external toothing at least of the one form-fit subregion and of the force-fit subregion comprises tooth spaces with at least two mutually different root circle diameters, and the internal toothing of the hub has teeth with at least two mutually different tip circle diameters which correlate with the tooth spaces, which have different root circle diameters, of the base shaft, wherein the combination of the teeth of the internal toothing of the hub with the first tip circle diameter with the tooth spaces of the external toothing of the base shaft with the second root circle diameter forms a sliding fit and the combination of the teeth of the internal toothing of the hub with the second tip circle diameter with the tooth spaces of the external toothing of the base shaft with a first root circle diameter forms a sliding fit. Here, at least the form-fit connection or the force-fit connection of the hub to the base shaft for the axial fixing of the hub exists owing to an interference-fit connection formed combination of at least that tooth space of the base shaft which has a first root circle diameter and that tooth of the internal toothing which has a non-correlating second tip circle diameter. Advantageously, an external toothing is formed on the base shaft, and thus a facility is created for guiding different hubs axially along the base shaft and at the same time connecting said hubs rotationally conjointly to said base shaft, as is the case for example in sliding cam systems. For the rotationally conjoint connection of the base shaft to the hub, the toothing of the base shaft provides multiple form-fit elements for forming a form-fit connection. It is advantageously the case that no form fit is formed between the base shaft and the hub, with its internal toothing, in the alignment region, whereby the hub can be rotated or turned into a desired angular position relative to the base shaft or the external toothing thereof. It is furthermore advantageously the case that no force-fit connection is formed in the alignment region, whereby the angular position of the hub can be adjusted with little force and in a material-conserving manner (because no friction or material abrasion is involved). The alignment region advantageously extends over the entire circumference of the base shaft, but at least over a circumferential segment, in order to allow the desired angular alignment of the hub relative to the external toothing or relative to the base shaft. The alignment region may be formed for example by virtue of the external toothing being ground away or milled away. It is furthermore possible for no external toothing to be formed on the base shaft in the alignment region. It is advantageous that, in the combination of those teeth of the internal toothing of the hub which have the first tip circle diameter with those tooth spaces of the external toothing of the base shaft which have the second root circle diameter and the combination of those teeth of the internal toothing of the hub which have the second tip circle diameter with those tooth spaces of the external toothing of the base shaft which have the first root circle diameter, a sliding fit is formed between these. In this way, the hub can advantageously be displaced over the external toothing without damaging the external toothing. It is advantageously possible for the undamaged external toothing to be used for the rotationally conjoint connection of other components or for the purposes of axial guidance during the displacement. The combination of that tooth of the internal toothing which has a second tip circle diameter and of that tooth space of the external toothing which has a first root circle diameter is advantageously utilized for the axial fixing of the hub on the base shaft, whereby the flanks of the external toothing are not damaged as the hub is pushed over. In addition to the axial fixing of the hub, the interference-fit connection that is formed here may, in particular also serve for the fixing of said hub against rotation. This may supplement or replace the form-fit connection with the external toothing of the base shaft.

The proportions of the respective diameters of the root circles of the tooth spaces or of the tip circles of the teeth with respect to one another are preferably configured as discussed below. The first diameter of the root or tip circle is larger than the second diameter of the respective root or tip circle. The axis of rotation of the camshaft may serve as a basis for the consideration. Understandably, the tip circle diameter of the base shaft is larger than the root circle diameter of this toothing. The two root circle diameters of the base shaft toothing are to be considered relative to one another analogously. The same basis for reference applies vice versa to the internal toothing of the hub. It is thus apparent that the tip circle diameter of the hub internal toothing is smaller than the root circle diameter thereof. The corresponding proportions of the further relevant diameters correspond to the same pattern.

The hub that is to be fixed in axially non-displaceable fashion may for example be a sensor encoder wheel, a cam for actuating valves of the internal combustion engine, or a pump cam for actuating a fuel pump or a vacuum pump. It is however also conceivable for the hub to be formed as an assembled multiple-cam system. It is furthermore advantageous that the alignment region does not form a form-fit subregion or force-fit subregion for the hub with its internal toothing, in order that the hub does not form a rotationally conjoint connection to the base shaft in this region, and can be rotated or turned into its required angular position in order to then, in a corresponding angular position, form at least the form-fit connection or the force-fit connection with the base shaft for the axial fixing of the hub owing to an interference-fit connection formed between at least that tooth space of the external toothing of the base shaft which has the first root circle diameter and that tooth of the internal toothing of the hub which has a non-correlating second tip circle diameter.

The external toothing of the base shaft may advantageously be designed for example as a multi-tooth profile, for example a spline profile or toothed hub profile with involute toothing. The external toothing may however also be formed as a polygonal profile or as a similar non-circular shape which can ensure the rotationally conjoint fixing of the hub on the base shaft for example in the form of a force fit and/or form fit for the purposes of transmitting a torque between hub and base shaft.

In the context of the invention, it is furthermore conceivable for the two tooth spaces, which have the different root circle diameters, of the base shaft to be formed in an encircling manner in an alternating sequence. It is thus advantageously the case that a multiplicity of different root circle diameters is provided, whereby axial securing against relatively high forces is made possible. It is advantageously thus furthermore the case that the different root circle diameters of the tooth spaces of the external toothing are distributed uniformly over the circumference, resulting in a uniform introduction of force into the hub. The uniform expansion or change in shape of the hub is advantageous here. However, if the hub is subject to an introduction of torque or torque loading which is non-uniform over the circumference of the base shaft, such as arises for example in the case of cams or pump cams, it is however also conceivable for the tooth spaces with their different root circle diameters to be distributed non-uniformly over the circumference, and then for example in a manner adapted to the acting torque profile. It is thus advantageously possible to optimize the axial fixing of the hub on the base shaft, and the interference-fit connection between base shaft and hub can better withstand the fluctuating loads.

A further configuration of an assembled camshaft for an internal combustion engine is also claimed, wherein the camshaft comprises a base shaft and an external toothing which extends at least in certain portions axially along the base shaft, and comprising at least one hub with an internal toothing which correlates with the external toothing of the base shaft such that the hub is connected rotationally conjointly and axially non-displaceably to the base shaft. The external toothing has at least one form-fit subregion, which extends at least in certain portions axially along the base shaft, or one force-fit subregion in order for the hub to be arranged at least in a force-fitting manner, and wherein the external toothing of the form-fit subregion or of the force-fit subregion has teeth with a tip circle diameter, and wherein the form-fit subregion or the force-fit subregion is adjoined by at least one alignment region which extends at least in certain portions axially along the base shaft and which serves for the angular alignment of the hub. The tooth spaces of the internal toothing of the hub have at least two different root circle diameters, wherein that tooth space of the hub which has a first root circle diameter correlates and forms a sliding fit with a tooth, which has the stated tip circle diameter, of the base shaft, and wherein at least the force-fit connection of the hub to the base shaft for the axial fixing of the hub exists owing to an interference-fit connection formed between that tooth of the base shaft which has a tip circle diameter and that tooth space of the internal toothing which has a non-correlating second root circle diameter. The external toothing advantageously thus has teeth with only one tip circle diameter and tooth spaces with only one root circle diameter, and can be produced for example by rolling and thus in a straightforward and cost-optimized manner. Advantageously, with this external toothing, a facility is created for guiding different hubs axially along the base shaft and at the same time connecting said hubs rotationally conjointly and axially non-displaceably to said base shaft, as is the case for example in sliding cam systems. It is advantageously also the case in this refinement, as in the configurations described above, that, in the alignment region, no rotationally conjoint connection is formed between the external toothing of the base shaft and the hub with its internal toothing, whereby the hub can be rotated or turned into a desired angular position relative to the base shaft or the external toothing thereof. The alignment region advantageously extends over the entire circumference of the base shaft, but at least over a circumferential segment, in order to allow an angular alignment of the hub relative to the external toothing. It is furthermore advantageously the case that no force-fit connection is formed in the alignment region, whereby the angular position of the hub can be adjusted with little force and in a material-conserving manner (because no friction or material abrasion is involved). The alignment region may be formed for example by virtue of the external toothing being ground away or milled away. It is furthermore possible for no external toothing to be formed on the base shaft in the alignment region. It is advantageously the case that that tooth space or those tooth spaces of the hub which has/have a first root circle diameter form(s) a sliding fit with that tooth or those teeth of the base shaft which has/have a tip circle diameter, and that that tooth or those teeth of the hub which has/have a tip circle diameter form(s) a sliding fit with that tooth space or those teeth comprising same which has/have a root circle diameter, whereby the hub can be displaced over the external toothing without damaging the latter. It is advantageously possible for the undamaged external toothing to be used for the rotationally conjoint connection of other components or for the purposes of axial guidance during the displacement. That tooth space of the internal toothing which has the non-correlating second root circle diameter of the internal toothing and the tip circle diameter of the external toothing are advantageously utilized for the force-fitting axial fixing of the hub, whereby the flanks of the external toothing are not damaged as the hub is pushed over.

In one advantageous configuration, the form-fit subregion and/or the force-fit subregion are divided by the alignment region into at least two axially spaced-apart form-fit subregions and/or force-fit subregions. It is advantageously possible, by means of this arrangement or sequence of the regions and corresponding combination of the correlating diameters of the toothings, for the hub to be pushed over regions of the external toothing without forming an interference-fit connection and damaging the toothing. It is only in the immediate vicinity of the end position, after the angular alignment of the hub in the alignment region, that the interference-fit connection is formed between the base shaft and the hub. The hub therefore only needs to be pushed over a short region of the external toothing. The forces for the assembly process, and the displacement travel, can consequently be reduced, and the risk of damage to the external toothing can be minimized. In one advantageous refinement of the invention, multiple form-fit subregions and/or force-fit subregions and multiple alignment regions extend in an alternating manner at least in certain portions in an axial direction along the base shaft. An alignment region is thus advantageously closer to the end position of the hub, wherein the displacement travel of the hub over the toothing with an interference fit formed between the base shaft and the hub can be reduced.

In the case of another preferred configuration of the invention, the internal toothing of the hub is divided with its axial extent into at least two subregions. With corresponding configuration or dimensioning of the axial extent of the hub with its internal toothing and of the alignment regions, the toothing of the hub can be pushed into the at least two alignment regions. The internal toothing of the hub is accordingly advantageously distributed over multiple axially spaced-apart subregions. It is advantageously thus possible for the individual alignment regions to be formed so as to be axially shorter than a single alignment region that is intended to receive the corresponding internal toothing of the hub during a turning process. In this way, the external toothing which, for other hubs, is utilized for the rotationally conjoint fixing and for the axial guidance on the base shaft merely needs to be broken up into smaller parts in these regions, whereby the transmissible torque is increased, or the force distribution during transmission of torque between shaft and hub is distributed.

In a further preferred configuration according to the invention, the internal toothing of the hub has a greater number of teeth than the external toothing of the base shaft. It is advantageously possible for multiple teeth to engage into one tooth space of the external toothing of the base shaft, and the hub can, in its angular alignment, be fixed on the base shaft having been angularly aligned in smaller steps.

In another preferred and advantageous refinement of the camshaft according to the invention, said camshaft has a second hub with an internal toothing which has a tip circle diameter and a root circle diameter, wherein the internal toothing of the hub correlates and forms a sliding fit with the external toothing of the base shaft.

In the method according to the invention for producing an assembled camshaft, a base shaft is provided, in the case of which the surface is machined such that, in at least one subregion, an external toothing is formed which extends at least in certain portions axially along the base shaft, which external toothing provides at least one form-fit subregion or one force-fit subregion for the at least one hub with its internal toothing in order to ensure the connection to the base shaft. Furthermore, the external toothing is formed so as to have multiple teeth with a tooth space, and the tooth space has two mutually different root circle diameters. Furthermore, in the method according to the invention, an alignment region is formed on the base shaft, which alignment region axially adjoins the form-fit subregion and/or the force-fit subregion and does not form a form-fit subregion and/or force-fit subregion for the hub with its internal toothing. Furthermore, a hub with an internal toothing running in an axial direction is provided, which internal toothing correlates with the external toothing of the base shaft, and the internal toothing has at least two teeth with mutually different tip circle diameters, wherein that tooth which has a first tip circle diameter is formed so as to be larger than that tooth which has a second tip circle diameter. During the installation of the hub, the hub is threaded in an angularly aligned manner onto the external toothing of the base shaft, and the inter-correlating external toothing of the base shaft, with its tooth spaces and the second root circle diameter, and the internal toothing of the hub, with the second tip circle diameter, form a sliding fit. The hub is displaced axially along the form-fit subregion of the base shaft until the internal toothing of the hub has been pushed into the alignment region. Subsequently, angularly precise alignment of the hub relative to the external toothing of the base shaft is performed such that at least one diameter pairing or combination composed of that tooth space or those tooth spaces of the external toothing which has/have a first root circle diameter and that tooth or those teeth of the internal toothing which has/have a second tip circle diameter is formed, and these are in axial alignment. Subsequently, an axial displacement of the hub along the form-fit subregion or the force-fit subregion of the base shaft as far as the end position thereof is performed, wherein, owing to the overlap that exists between that tooth space of the base shaft which has a first root circle diameter and that tooth of the hub of the hub which has a second tip circle diameter (wherein it may also be the case that multiple tooth spaces have a first root circle diameter and/or multiple teeth have a second tip circle diameter), an interference-fit connection is formed between the base shaft and the hub, whereby the hub is fixed against axial displacement. Owing to the interference-fit connection between the base shaft and the hub, these also form a force-fit subregion. The force-fit subregion encompasses at least the axial length of that internal toothing of the hub which is involved in the interference-fit connection.

All of the advantages that have already been described with regard to an assembled camshaft according to the first aspect of the invention arise in the case of the described method.

In a further configuration of the method according to the invention for producing an assembled camshaft, a base shaft is provided, in the case of which the surface is machined such that, in at least one subregion, an external toothing is formed which extends at least in certain portions axially along the base shaft and provides a form-fit subregion or a force-fit subregion for the at least one hub with its internal toothing in order to ensure the connection of the hub to the base shaft. Furthermore, the external toothing is formed so as to have a tip circle diameter. Furthermore, in the method according to the invention, an alignment region is formed on the base shaft, which alignment region axially adjoins the form-fit subregion or the force-fit subregion and does not form a form-fit subregion for the hub with its internal toothing. Furthermore, a hub with an internal toothing running in an axial direction is provided, which internal toothing correlates with the external toothing of the base shaft and is designed such that multiple teeth and multiple tooth spaces are formed, and the tooth spaces have at least two mutually different root circle diameters, wherein that tooth space which has a first root circle diameter is formed so as to be larger than that tooth space which has a second root circle diameter. During the installation of the hub, the hub is threaded in an angularly aligned manner onto the external toothing of the base shaft, and the inter-correlating external toothing of the base shaft and the internal toothing of the hub are aligned in an axial direction. A combination of the tip circle diameter of the external toothing, in particular of those teeth of the external toothing which have a tip circle diameter, with the first root circle diameter of the internal toothing of the hub, in particular with that tooth space or those tooth spaces of the internal toothing of the hub which have a first root circle diameter, form a sliding fit. The hub is displaced axially along the form-fit subregion and/or force-fit subregion of the base shaft until the internal toothing of the hub has been pushed into the alignment region. Subsequently, angularly precise alignment of the hub relative to the external toothing of the base shaft is performed such that at least one combination of tip circle diameter of the external toothing and the second root circle diameter of the internal toothing is in axial alignment. Subsequently, an axial displacement of the hub along the form-fit subregion and/or force-fit subregion of the base shaft as far as the end position thereof is performed, wherein, owing to the overlap that exists between the tip circle diameter of the base shaft, in particular the at least one tooth having the tip circle diameter, and the second root circle diameter of the hub, in particular the at least one tooth space having the second root circle diameter, an interference-fit connection is formed between the base shaft and the hub, whereby the hub is fixed against axial displacement. Furthermore, the force-fit subregion of the base shaft is formed by means of the interference-fit connection between base shaft and hub. The force-fit subregion extends along the base shaft at least so as to encompass the length of the internal toothing of the hub and the end position thereof on the base shaft. It is however also conceivable for the force-fit subregion to furthermore encompass the displacement travel of the hub.

All of the advantages that have already been described with regard to an assembled camshaft according to the second aspect of the invention arise in the case of the described method.

In a preferred configuration of the method according to the invention, the alignment region is arranged such that the form-fit subregion and/or force-fit subregion are/is divided by the alignment region into at least two axially spaced-apart form-fit subregions and/or force-fit subregions. It is advantageously thus possible for the displacement travel, that is to say the travel along which the hub is pushed over the external toothing with an interference fit, to be shortened. The risk of damage to the external toothing is thus reduced.

In a further preferred configuration of the invention, the alignment region is formed by cutouts in the external toothing, for example by milling or grinding. It is for example advantageously possible for a continuous external toothing to be formed, which is then interrupted, and divided into different form-fit subregions or force-fit subregions, by means of at least one retroactively introduced or formed alignment region. In this way, it is for example possible to utilize rolling for the purposes of forming the toothing. Furthermore, the external toothing may advantageously be removed, such that it no longer constitutes a form-fit subregion and/or force-fit subregion of the internal toothing of the hub, over the entire circumference of the base shaft or only in a circumferential segment. The external toothing may, in the other regions, be maintained and utilized for a rotationally conjoint connection or for axial guidance of the hubs with or on the base shaft. Alternatively, it is however also conceivable for the external toothing to be formed by means of cold drawing or form drawing and the like, wherein the alignment region is in this case formed preferably directly during the generation of the external toothing. Reworking by means of grinding or milling may however be performed. It is advantageously the case that no form fit is formed between the base shaft and the hub, with its internal toothing, in the alignment region, whereby the hub can be rotated or turned into a desired angular position relative to the base shaft or the external toothing thereof. It is furthermore advantageously the case that no force-fit connection is formed in the alignment region, whereby the angular position of the hub can be adjusted with little force and in a material-conserving manner (without friction or material abrasion).

In a preferred refinement of the method according to the invention, a second hub is mounted onto the camshaft, wherein the second hub comprises an internal toothing which has a tip circle diameter and a root circle diameter, and the internal toothing correlates and forms a sliding fit with the external toothing of the base shaft. The second hub can advantageously be axially displaced, and thus permits the implementation of a sliding cam system.

Figure 1:
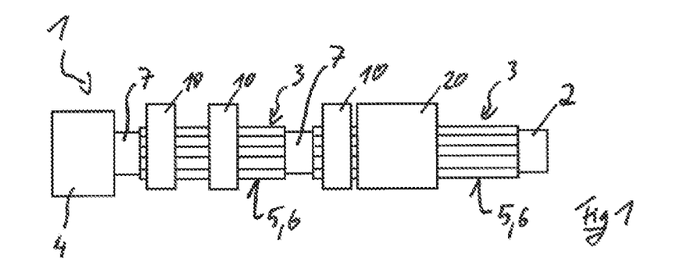
FIG. 1 is a side view of an embodiment of an assembled camshaft.

FIG. 1 schematically shows an assembled camshaft 1 for an internal combustion engine which is constructed in accordance with the principle of a camshaft with sliding cam elements. The assembled camshaft 1 comprises at least a base shaft 2, with an external toothing, and a hub 10 connected rotationally conjointly and non-displaceably to the base shaft. The base shaft 2 is preferably of rod-shaped form and may be formed as a hollow shaft or solid shaft. The hub 10 may for example be a sensor wheel or a cam, such as for example a pump cam or a cam for valve actuation. At one end, the base shaft 2 has an end piece 4, to which, for example, a toothed wheel (not shown here) for the drive of the camshaft 1 can be attached. The end piece 4 may be formed integrally with the base shaft 2 or may be manufactured separately and retroactively installed. It is furthermore conceivable for no end piece 4 to be formed on the base shaft 2, but rather for a diameter enlargement or the like to be provided. All variants have in common the fact that the components can be mounted only from one side of the camshaft 1.

As is also illustrated in FIG. 1, the assembled camshaft 1 may have multiple rotationally conjoint and axially non-displaceable hubs 10. The external toothing 3 of the base shaft 2 is formed for example by a multi-tooth profile in the form of an involute toothing. The multi-tooth profile of the external toothing 3 may also be formed as a polygon or similar non-circular shape. It is essential here that the non-circular shape can rotationally conjointly fix the hub 10 and transmit the torque for transmission from the base shaft 2 to the hub 10. The external toothing 3 may be formed on the rod-shaped base shaft 2 for example by means of a rolling, milling and/or drawing process. The external toothing 3 forms a form-fit subregion 5 or a force-fit subregion 6 for the hub 10. The form-fit subregion 5 serves for example for the axial guidance of the hubs 10 during the installation process. The hub 10 is fixed in an axially non-displaceable manner to the base shaft 2 by means of an interference fit described in more detail further below. A rotationally conjoint connection between base shaft 2 and hub 10 may be realized by means of this interference-fit connection or by means of the form-fit subregions 5 of the camshaft 1. Mutual support or supplementation for the purposes of fixing of the hub 10 on the base shaft 2 is likewise possible. The force-fit subregion 6 of the base shaft 2 is formed by means of the interference-fit connection between base shaft 2 and hub 10. The force-fit subregion 6 extends along the base shaft 2 at least so as to encompass the length of the internal toothing of the hub 10 and the end position thereof on the base shaft 2. It is however also conceivable for the force-fit subregion 6 to furthermore encompass the displacement travel of the hub 10. It is therefore conceivable for both subregions, specifically a form-fit region 5 and a force-fit subregion 6, to be formed axially spaced apart from one another on the base shaft 2 such that both subregions extend at least in certain portions axially along the base shaft 2. It is advantageous for both subregions to extend all the way around the base shaft 2 in a circumferential direction. In the configuration shown in FIG. 1, the external toothing 3 is divided into two subregions, and thus into two form-fit subregions 5 or two force-fit subregions 6. Between the two subregions and between the end piece 4 and one of the two subregions, in particular the second subregion of the external toothing 3, there is formed in each case one alignment region 7.

If the external toothing 3 is formed for example by rolling of the rod-shaped base shaft 2, the alignment region 7 can be formed by retroactive grinding or milling of said external toothing 3. It is however also possible for the external toothing 3 to be formed only in certain portions over the axial length on the base shaft, whereby the alignment regions 7 may also already be formed, in particular by virtue of machining of the surface of the base shaft 2 not being performed in regions between the machined portions. For example, during a drawing process in which a rod-shaped body is pulled or pushed through a die, the form of the alignment region 7 and of the subregion, in particular of the form-fit subregions 5 and/or of the force-fit subregions 6, of the external toothing 3 may be formed in a manner dependent on the axial arrangement thereof on the base shaft 2. Then, retroactive machining of the base shaft 2 for the purposes of forming the alignment region 7 is preferably not necessary.

Furthermore, the assembled camshaft 1 has a further hub 20, which is displaceable along the external toothing, in particular along the subregions formed, such as the force-fit subregion 6 and/or the form-fit subregion 5. The further hub 20 constitutes a sliding cam element, as is already well known from the general prior art. The external toothing 3 of the base shaft 2 forms a form-fit subregion 5 for the hub 20. The hub 20 is guided axially along the base shaft 2, and connected rotationally conjointly thereto, by means of the form-fit subregion 5.

Figure 2:
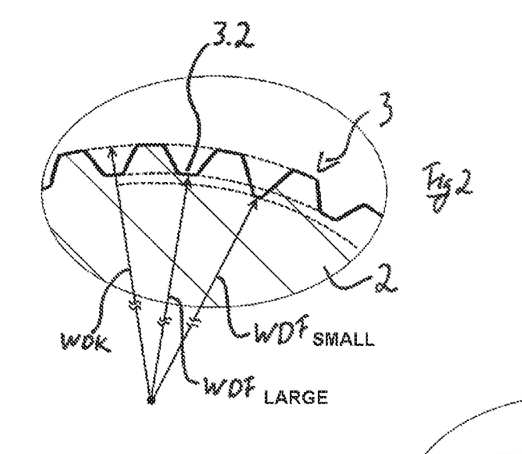
FIG. 2 is an enlarged detail view of a cross section of a configuration of a base shaft, which has an external toothing, of an assembled camshaft.

FIG. 2 shows an enlarged detail of a cross section of a base shaft 2 of an embodiment of an assembled camshaft according to the invention. The external toothing 3, designed here for example as an involute toothing, the teeth 3.1 of which in particular have a (single) tip circle diameter WDK, whereas the tooth spaces 3.2 of said toothing have two root circle diameters, in particular a first root circle diameter $WDF_{large}$ and a second root circle diameter $WDF_{small}$. FIG. 2 shows, by way of example, a tooth space 3.2 with the second root circle diameter $WDF_{small}$ which, as illustrated, has a smaller diameter than the tooth space 3.2 which has a first root circle diameter $WDF_{large}$. Depending on the configuration, the number and distribution of the various large and small tooth spaces 3.2 may vary. Preferably, these differently dimensioned tooth spaces 3.2 are distributed uniformly over the circumference such that the tooth spaces 3.2 with a first root circle diameter $WDF_{large}$ and the tooth spaces 3.2 with a second root circle diameter $WDF_{small}$ alternate.

Figure 3:
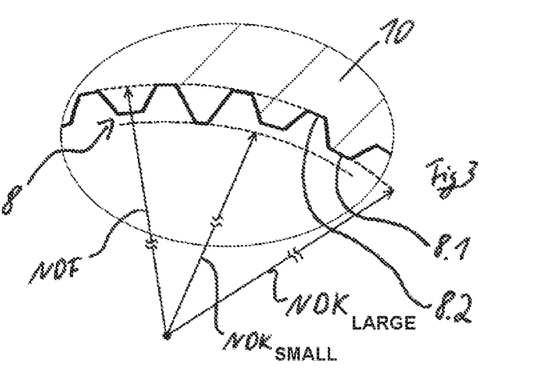
FIG. 3 is an enlarged detail view of a cross section of a configuration of a hub, which has an internal toothing, of an assembled camshaft.

FIG. 3 shows an enlarged detail of a cross section through a hub 10 of an embodiment of an assembled camshaft 1 according to the invention. The hub 10 has an internal toothing 8 which extends in an axial direction. In the embodiment shown in FIG. 3, the internal toothing 8 has teeth 8.1 with in each case two mutually different tip circle diameters, specifically a first, in particular large-dimensioned tip circle diameter $NDK_{large}$ and a second, in particular small-dimensioned tip circle diameter $NDK_{small}$. As is also shown in FIG. 3, the first tip circle diameter $NDK_{large}$, in particular the tooth 8.1 which has a first tip circle diameter $NDK_{large}$, is larger than the second tip circle diameter $NDK_{small}$, in particular is larger than the tooth 8.1 which has a second tip circle diameter $NDK_{small}$. Depending on the configuration, the number and the distribution of the teeth 8.1 which have respectively different tip circle diameters, and thus the formation of teeth of different sizes, may be varied. Preferably, the different teeth or the different tip circle diameters may be distributed in a uniformly alternating manner over the circumference of the internal toothing 8 of the hub 10. Between the teeth 8.1 of the internal toothing 8 of the hub 10, there are formed tooth spaces 8.2 which advantageously have a mutually identical root circle diameter NDF.

The dimensions of the internal toothing 8 of the hub 10 are selected such that those teeth 8.1 of the internal toothing 8 of the hub 10 which have a first tip circle diameter $NDK_{large}$ form a sliding fit with those tooth spaces 3.2 of the external toothing 3 of the base shaft 2 which have a second root circle diameter $WDF_{small}$, and those teeth 8.1 of the internal toothing 8 of the hub 10 which have a second tip circle diameter $NDK_{small}$ form a sliding fit with those tooth spaces 3.2 of the external toothing 3 of the base shaft 2 which have a first tip circle diameter $WDF_{large}$. The combination of those teeth 8.1 of the internal toothing 8 of the hub 10 which have a first tip circle diameter $NDK_{large}$ and those tooth spaces 3.2 of the external toothing 3 of the base shaft 2 which have a first root circle diameter $WDF_{large}$ results in an overlap and thus an interference-fit connection between the base shaft 2 and the hub 10.

Figure 4:
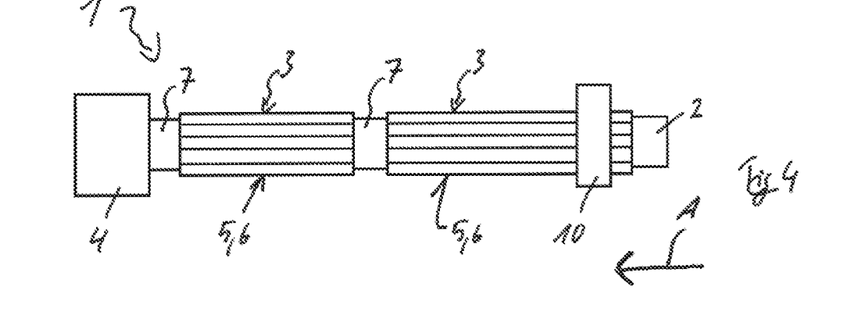
FIG. 4 is a method step during the execution of an embodiment of the method.
Figure 6:
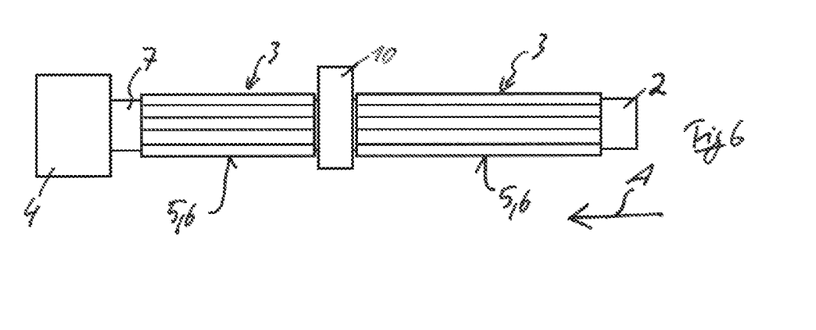
FIG. 6 is a further method step during the execution of an embodiment of the method.
Figure 9:
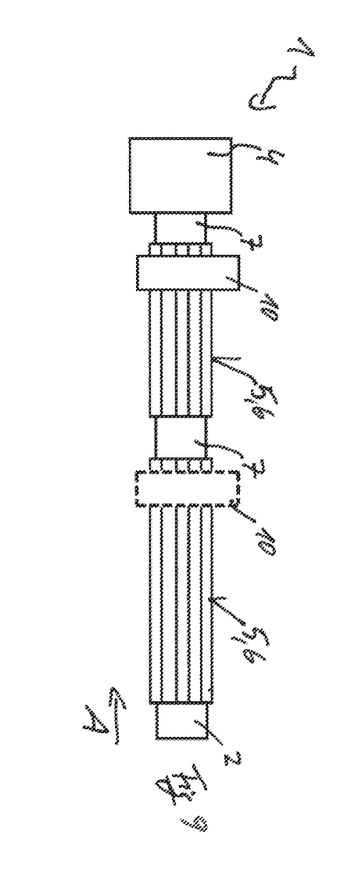
FIG. 9 is a further method step during the execution of an embodiment of the method.

FIGS. 4, 6 and 9 show different stages of the method according to the invention during the production of a camshaft 1 according to the invention. FIG. 4 shows the base shaft 2 with an end piece 4. The external toothing 3 has already been formed on the base shaft 2. The external toothing 3 is divided by an alignment region 7 into two subregions, or an alignment region 7 is formed between two subregions of the external toothing 3. During a process of installation of a hub 10, the hub 10, which is to be arranged in an axially non-displaceable manner on the base shaft 2, is pushed in a threading direction A to a first subregion of the external toothing 3 and thus onto the first form-fit subregion 5 of the base shaft 2. In order to enable the hub 10 to be pushed on, the hub 10 must be angularly aligned relative to the base shaft 2. For this purpose, the hub 10 is aligned relative to the external toothing 3 of the base shaft 2 such that those teeth 8.1 (cf. FIG. 3) of the internal toothing 8 of the hub 10 which have a second tip circle diameter $NDK_{small}$ are aligned, and form a correlating diameter pairing, with those tooth spaces 3.2 (cf. FIG. 2) of the external toothing 3 of the base shaft 2 which have a second root circle diameter $WDF_{small}$, and those teeth 8.1 (cf. FIG. 3) of the internal toothing 8 of the hub 10 which have a first tip circle diameter $NDK_{large}$ are aligned, and form a correlating diameter pairing, with those tooth spaces 3.2 (cf. FIG. 2) of the outer diameter 3 of the base shaft 2 which have a first root circle diameter $WDF_{large}$. By means of a relative movement between the base shaft 2 and the hub 10, the hub 10 is threaded onto the base shaft 2, wherein the external toothing 3 of the base shaft 2 and the internal toothing 8 of the hub 10 form a sliding fit.

Figure 5:
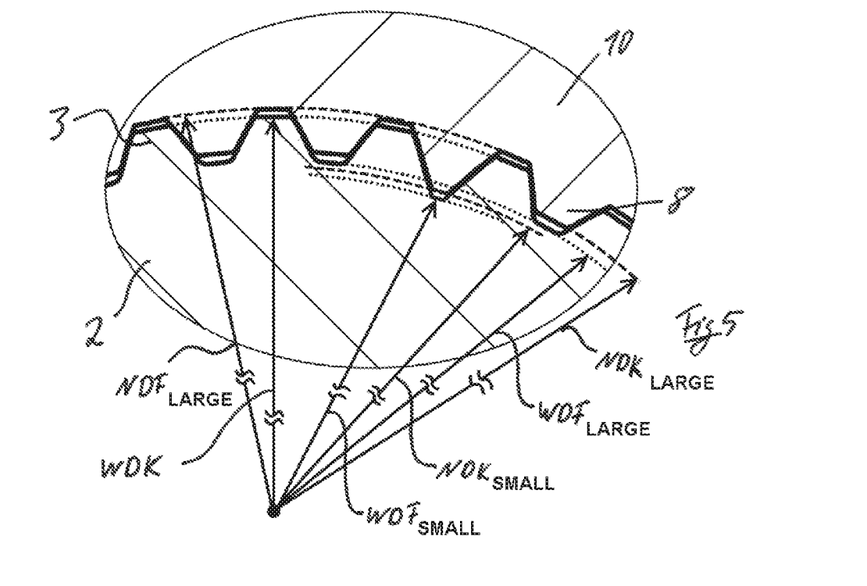
FIG. 5 is an enlarged detail view of a cross section of the base shaft and of the hub in the assembly step shown in FIG. 4.

During the displacement of the hub 10 along the first form-fit subregion 5, as shown in FIG. 4, the pairing of the correlating toothings sets a sliding fit. This situation is shown in FIG. 5.

FIG. 6 shows a further method step during the production of an embodiment of an assembled camshaft according to the invention. Here, the hub 10 has been displaced axially to such an extent that its internal toothing 8 is received in the alignment region 7. The form-fit subregion 5 does not act on the hub 10 here, whereby, in this situation, the hub 10 can be varied in terms of its angular alignment.

Figure 7:
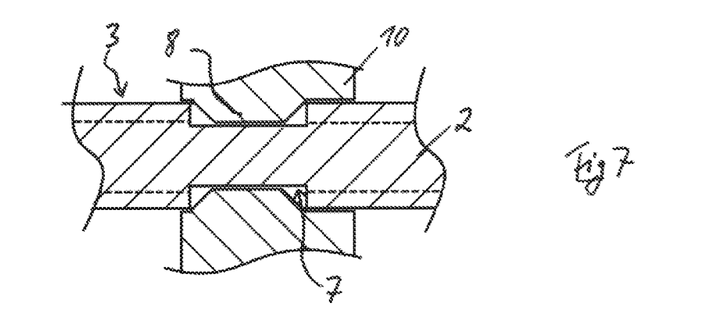
FIG. 7 is an enlarged detail view of a longitudinal section through the base shaft and the hub of an embodiment of a camshaft during the execution of the method step of the method as shown in FIG. 4.

This state as per FIG. 6 is illustrated in a longitudinal section in FIG. 7. The internal toothing 8 of the hub 10 is arranged in the alignment region 7. In the configuration shown, the internal toothing 8 of the hub 10 does not extend over the entire length of the hub 10. The alignment region 7 is dimensioned such that it can receive the internal toothing 8 of the hub 10 and can permit the rotation of the hub 10. Furthermore, it can be seen in FIG. 8 that the internal toothing 8 of the hub 10, in particular the teeth 8.1 of the internal toothing 8 of the hub 10, may have different tip circle diameters.

Figure 8:
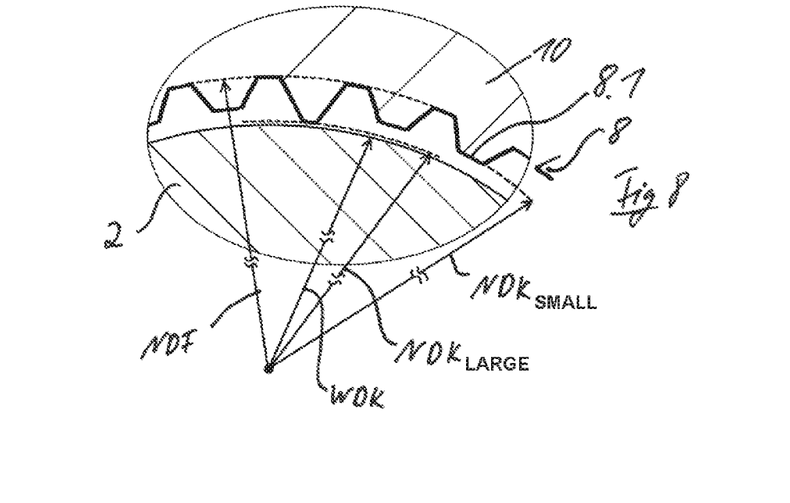
FIG. 8 is an enlarged detail view of a cross section through the base shaft and the hub of an embodiment of a camshaft during the execution of the further method step of the method as shown in FIG. 6.

Likewise, the state illustrated in FIG. 6 is shown in FIG. 8, in particular in a cross section through the base shaft 2 and the hub 10 during the positioning of the hub 10 in the alignment region 7. The teeth 8.1 of the internal toothing 8 of the hub with a first tip circle diameter $NDK_{large}$ and with a second tip circle diameter $NDK_{small}$ have no form-fit or force-fit connection to the base shaft 2. The hub 10 can be rotated and angularly aligned.

FIG. 9 illustrates a further method step. After the angular alignment of the hub 10 and the setting of the toothing pairing between hub 10 and base shaft 2 such that the overlap between hub 10 and base shaft 2 is set, the hub 10 is pushed along the form-fit subregion 5 or into the end position thereof, and thus forms the force-fit subregion 6 here. Proceeding from the situation in FIG. 6, the hub can be displaced in the threading direction A or counter to the threading direction A, as is also indicated by means of the hub 10 illustrated by dashed lines. If it is the intention for the hub 10 to assume the end position corresponding to the left-hand position in FIG. 9 (displacement of the hub 10 in the threading direction A), a displacement of the hub 10 as far as the alignment region 7 adjoining the end piece 4 is also possible. There, it would then be possible for the angular alignment of the hub 10 to be performed, and it would subsequently be possible for the hub 10 to be displaced into the end position (in particular counter to the threading direction A). It is however also possible by means of corresponding angular rotation of the hub 10 in the alignment region 7 between the two form-fit subregions 5 or the two force-fit subregions 6, and by means of a subsequent displacement of the hub 10 in the threading direction A, for said hub to be moved into its end position, in particular onto a subregion of the toothing 3.

Figure 10:
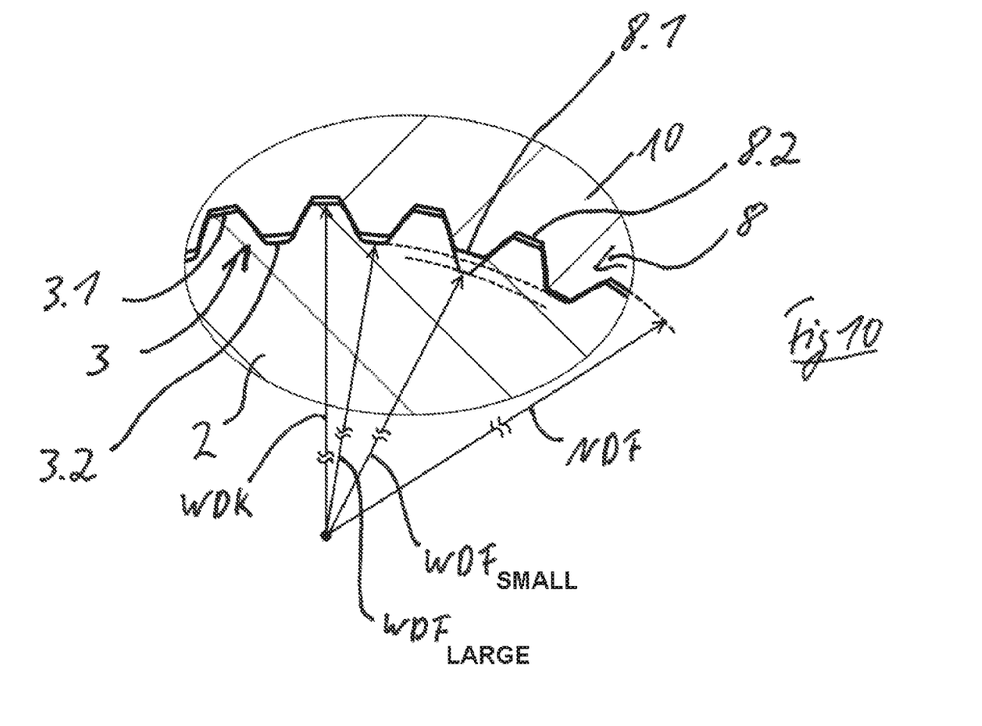
FIG. 10 is an enlarged detail view of a cross section through the base shaft and the hub of an embodiment of a camshaft during the execution of the further method step of the method as shown in FIG. 9.

The situation as per FIG. 9, in which the hub 10 has been moved into the end position, is also illustrated in an enlarged detail as a cross section in FIG. 10. Those teeth 8.1 of the internal toothing 8 of the hub 10 which have a first tip circle diameter $NDK_{large}$ are brought into engagement with those tooth spaces 3.2 of the external toothing 3 of the base shaft 2 which have a first root circle diameter $WDF_{large}$. An interference-fit connection is thus formed between the base shaft 2 and the hub 10, whereby the hub is axially fixed.

Figure 11:
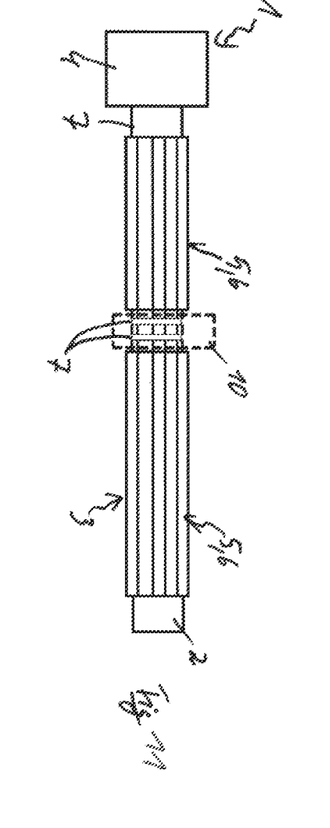
FIG. 11 is a further method step during the execution of an embodiment of the method.
Figure 12:
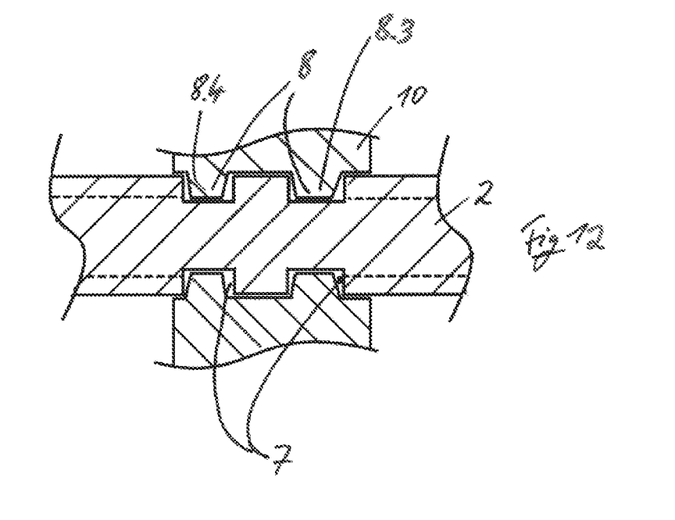
FIG. 12 is an enlarged detail view of a cross section through the base shaft and the hub of an embodiment of a camshaft during the execution of the further method step of the method as shown in FIG. 11.

FIG. 11 shows a configuration in which multiple form-fit subregions 5 and/or force-fit subregions 6, and in each case one alignment region 7 between these, are formed. The alignment regions 7 and the form-fit subregions 5 and/or force-fit subregions 6 alternate with one another along the base shaft 2 as viewed in an axial direction. The hub 10 illustrated by dashed lines is situated in a position in which it can be angularly aligned. This state is likewise shown in FIG. 12, which shows an enlarged detail of hub 10 and base shaft 2 in longitudinal section. The corresponding arrangement of the internal toothing 8 in the alignment regions 7 is hereby illustrated. In this refinement, the internal toothing 8 of the hub 10 is axially divided, specifically into two portions 8.3 and 8.4. In principle, it is also conceivable for the internal toothing 8 of the hub 10 to be divided into more than two portions, in particular three or more portions. It advantageously arises from this that the form-fit subregions 5 and/or the force-fit subregions 6 of the base shaft 2 are broken up into axially shorter portions. Since these form-fit subregions 5 have interruptions which are of smaller axial extent, they can be better utilized for other hubs and the torque transmission or axial guidance thereof.

Figure 13:
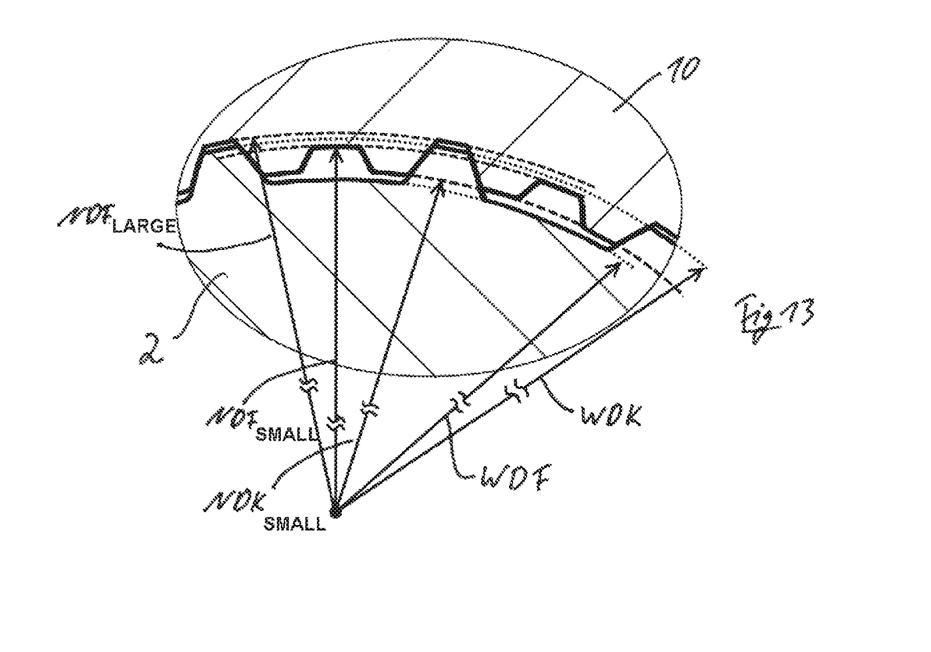
FIG. 13 is an enlarged detail view of a cross section of a base shaft and of a hub of a further embodiment of an assembled camshaft.

A further embodiment of the assembled camshaft 1 according to the invention is illustrated in cross section as an enlarged detail in FIG. 13. The hub 10 has an internal toothing 8 with tooth spaces 8.2 having two different root circle diameters $NDF_{large}$, $NDF_{small}$, whereas the external toothing 3 of the base shaft 2 has an external toothing 3 with (only) one (single) tip circle diameter WDK and (only) one (single) root circle diameter WDF. It can furthermore be seen that the external toothing 3 of the base shaft 2 has only such a number of teeth 3.2 that these engage exclusively into one type of the tooth spaces 8.2, in this angular alignment for example into the first root circle diameter $NDF_{large}$ of the hub 10. The interference-fit connection between the base shaft 2 and the hub 10 is set by the toothing pairing of teeth 3.1 of the external toothing 3 of the base shaft 2 with the tip circle diameter WDK and those tooth spaces 8.2 of the internal toothing 8 of the hub 10 which have the second root circle diameter $NDF_{small}$. The toothing pairing formed from those teeth 3.1 of the external toothing 3 of the base shaft 2 which have the tip circle diameter WDK and those tooth spaces 8.2 of the internal toothing 8 of the hub 10 which have a first root circle diameter $NDF_{large}$, as shown in FIG. 13, forms a sliding fit.

LIST OF REFERENCE DESIGNATIONS

1 Camshaft
2 Base shaft
3 External toothing
3.1 Tooth of the external toothing
3.2 Tooth space of the external toothing
4 End piece
5 Form-fit subregion
6 Force-fit subregion
7 Alignment region
8 Internal toothing of the hub
8.1 Tooth of the internal toothing
8.2 Tooth space of the internal toothing
8.3 Portion of the internal toothing
8.4 Portion of the internal toothing
10 First hub
20 Second hub
A Threading direction
WDK Tip circle diameter of the base shaft
WDF Root circle diameter of the base shaft
$WDF_{large}$ First root circle diameter of the base shaft
$WDF_{small}$ Second root circle diameter of the base shaft
$WDK_{large}$ First tip circle diameter of the base shaft
$WDK_{small}$ Second tip circle diameter of the base shaft
$NDK_{large}$ First tip circle diameter of the (first) hub
$NDK_{small}$ Second tip circle diameter of the (first) hub
NDK Tip circle diameter of the hub
$NDF_{large}$ First root circle diameter of the (first) hub
$NDF_{small}$ Second root circle diameter of the (first) hub
NDK2 Tip circle diameter of the second hub

What is claimed is:

1. An assembled camshaft for an internal combustion engine, wherein the camshaft comprises:
   a base shaft and an external toothing which extends axially along at least portions of the base shaft; and
   a hub with an internal toothing which fits with the external toothing of the base shaft such that the hub is connected rotationally conjointly and axially non-displaceably to the base shaft;
   wherein the external toothing has at least one form-fit subregion, which extends axially along at least a portion of the base shaft, or one force-fit subregion configured to arrange the hub at least in a form-fitting or force-fitting manner;
   and wherein at least the form-fit subregion or the force-fit subregion is adjoined by at least one alignment region which extends axially along at least a portion of the base shaft and which serves for the angular alignment of the hub;
   wherein the external toothing at least of the one form-fit subregion or of the force-fit subregion comprises at least two tooth spaces which are formed between the teeth and which have mutually different root circle diameters;
   wherein the internal toothing of the hub comprises at least two teeth which fit with the different root circle diameters and which have mutually different tip circle diameters;
   wherein a first tooth of the at least two teeth that has a first tip circle diameter forms a sliding fit with a tooth space of the base shaft which has a second root circle diameter, and the tooth of the hub which has a second tip circle diameter forms a sliding fit with the tooth space of the base shaft which has a first root circle diameter, and
   wherein at least the form-fit connection or the force-fit connection of the hub to the base shaft for the axial fixing of the hub is configured to form an interference-fit connection between at least the tooth space of the external toothing of the base shaft which has a first root circle diameter and the tooth of the internal toothing of the hub which has a second tip circle diameter.

2. The camshaft of claim 1 wherein the tooth spaces that have at least two different root circle diameters of the external toothing are formed in an encircling manner in an alternating sequence.

3. The camshaft of claim 2 wherein the teeth which have at least two different tip circle diameters of the internal toothing of the hub are formed in an encircling manner in an alternating sequence.

4. The camshaft of claim 1 wherein the form-fit subregion and/or force-fit subregion are/is divided by the alignment region into at least two axially spaced-apart subregions.

5. The camshaft of claim 1 wherein multiple form-fit subregions and/or force-fit subregions and multiple alignment regions extend alternatingly and axially along the base shaft.

6. The camshaft of claim 1 wherein the internal toothing of the hub is divided with its axial extent into at least two subregions.

7. The camshaft of claim 1 wherein the internal toothing of the hub has a greater number of teeth than the external toothing of the base shaft.

8. The camshaft of claim 1 wherein the camshaft comprises a second hub with an internal toothing which has a tip circle diameter and a root circle diameter, and the internal toothing forms a sliding fit with the external toothing of the base shaft.

9. An assembled camshaft for an internal combustion engine, wherein the camshaft comprises:
   a base shaft comprising an external toothing formed axially along at least a part of the base shaft; and
   a hub with an internal toothing that fits to the external toothing of the base shaft such that the hub is connected rotationally conjointly and axially non-displaceably to the base shaft, wherein the external toothing has at least one form-fit subregion or force-fit subregion that extends axially along at least part of the base shaft configured such that the hub is arranged at least in a form-fitting or force-fitting manner;
   wherein the external toothing at least of the form-fit subregion or of the force-fit subregion has a tip circle diameter, and wherein at least the form-fit subregion or the force-fit subregion is adjoined by at least one alignment region which extends axially along at least part of the base shaft and which is configured to align angularly the hub;
   wherein the internal toothing of the hub comprises tooth spaces which have at least two different root circle diameters, wherein a first tooth space of the tooth spaces has a first root circle diameter that forms a sliding fit with that external toothing of the base shaft which has the tip circle diameter; and
   wherein at least the form-fit connection or the force-fit connection of the hub to the base shaft for the axial fixing of the hub is formed by an interference-fit connection between the external toothing of the base shaft which has the tip circle diameter and the tooth spaces of the internal toothing which have second root circle diameters.

10. A method for producing an assembled camshaft, comprising:
    providing a base shaft;
    machining the surface of the base shaft in at least one subregion to generate external toothing which extends axially along at least part of the base shaft, said external toothing providing a form-fit subregion or a force-fit subregion configured to connect a hub thereto, wherein the external toothing defines at least two tooth spaces with mutually different root circle diameters;
    forming an alignment region on the base shaft, wherein the alignment region axially adjoins one or both of the form-fit subregion or the force-fit subregion;
    providing the hub with internal toothing extending at least in certain portions thereof in an axial direction, said internal toothing fitting to the external toothing of the base shaft and has at least two teeth with mutually different tip circle diameters, wherein a first tooth of the at least two teeth has a first tip circle diameter that is larger than a second tooth of the at least two teeth that has a second tip circle diameter;
    installing the hub, wherein the hub is threaded in an angularly aligned manner onto the external toothing of the base shaft such that the external toothing of the base shaft and the internal toothing of the hub form a sliding fit,
    axially displacing the hub at least along the form-fit subregion or the force-fit subregion of the base shaft until the internal toothing of the hub has been pushed into the alignment region;
    angularly precisely aligning the hub relative to the external toothing of the base shaft such that at least one diameter pairing composed of a first tooth space of the external toothing which has the first root circle diameter and said second tooth of the internal toothing which has the second tip circle diameter is in axial alignment;
    axially displacing the hub at least along the form-fit subregion or the force-fit subregion of the base shaft as far as an end position thereof, wherein, the fit of the first tooth space of the external toothing of the base shaft which has a first root circle diameter and said second tooth of the internal toothing of the hub which has a second tip circle diameter forms an interference-fit connection between the base shaft and the hub, whereby the hub is fixed against axial displacement.

11. The method of claim 10 wherein the form-fit subregion or the force-fit subregion is divided by the alignment region into at least two axially spaced-apart subregions.

12. The method of claim 10 wherein the alignment region is formed by cutouts in the external toothing.

13. The method of claim 10 wherein a second hub is mounted onto the camshaft, wherein the second hub comprises an internal toothing which has a tip circle diameter and a root circle diameter, and the internal toothing of the second hub forms a sliding fit with the external toothing of the base shaft.

* * * * *